United States Patent
Chang

(10) Patent No.: US 12,422,071 B2
(45) Date of Patent: Sep. 23, 2025

(54) WATER PIPE CONNECTION DEVICE

(71) Applicant: BEIMING INTERNATIONAL CORP., Taipei (TW)

(72) Inventor: Fang-Chi Chang, Taipei (TW)

(73) Assignee: BEIMING INTERNATIONAL CORP., Taipei (TW)

( * ) Notice: Subject to any disclaimer, the term of this patent is extended or adjusted under 35 U.S.C. 154(b) by 0 days.

(21) Appl. No.: 18/543,476

(22) Filed: Dec. 18, 2023

(65) Prior Publication Data
US 2024/0200702 A1    Jun. 20, 2024

(30) Foreign Application Priority Data
Dec. 19, 2022   (TW) .................................. 111148688

(51) Int. Cl.
*F16L 37/091*   (2006.01)

(52) U.S. Cl.
CPC ................................. *F16L 37/091* (2013.01)

(58) Field of Classification Search
CPC ......... F16L 25/06; F16L 25/12; F16L 37/091; F16L 37/092; F16L 37/0927; F16L 37/0925; F16L 37/0842; F16L 37/0845; F16L 37/086; F16L 37/0841; F16L 37/12; F16L 37/122; F16L 37/123; F16L 37/138
See application file for complete search history.

(56) References Cited

U.S. PATENT DOCUMENTS

2018/0038537 A1*   2/2018  Ahn .................... F16L 37/0927

FOREIGN PATENT DOCUMENTS

| CN | 102434741 A | 5/2012 |
|---|---|---|
| CN | 102575802 A | 7/2012 |
| CN | 104344127 A | 2/2015 |
| CN | 106838517 A | 6/2017 |
| CN | 108105503 A | 6/2018 |

OTHER PUBLICATIONS

Search Report issued in Taiwanese Application No. 111148688 mailed on Nov. 23, 2023 (2 pages).

* cited by examiner

*Primary Examiner* — Aaron M Dunwoody
(74) *Attorney, Agent, or Firm* — Osha Bergman Watanabe & Burton LLP

(57) ABSTRACT

A water pipe connection device includes a connecting tube, a fastening member, and a fixing unit. The connecting tube includes a tapering tube head and a tubular member. The fastening member is disposed in the tube head. The fixing unit is disposed in the tube head, and includes a fixing ring and a plurality of reverse toothed structures. A water pipe is clamped and positioned by teeth portions of the reverse toothed structures. When the water pipe connection device is in use, water flows into the tube head through a space between the tubular member and the water pipe, and the fastening member is pushed by the water to move the fixing unit towards a tapered end of the tube head, so that the fixing unit is pressed by the tube head to fix the water pipe.

6 Claims, 5 Drawing Sheets

WATER PIPE CONNECTION DEVICE

CROSS-REFERENCE TO RELATED APPLICATION

This application claims priority to Taiwanese Invention Patent Application No. 111148688, filed on Dec. 19, 2022, which is incorporated by reference herein in its entirety.

FIELD

The present disclosure relates to a connecting device, more particularly to a water pipe connection device.

BACKGROUND

During installation of water pipes, a conventional water pipe connection device is generally used to interconnect two water pipes together to lengthen the water pipes. In the installation process, a water pipe may be attached to the conventional water pipe connection device by hot-pressing after the water pipe is inserted into an opening of the conventional water pipe connection device, or may be fixed onto the opening of the conventional water pipe connection device by a ring. However, in either manner, additional tools are required for such operation, which is more troublesome.

Furthermore, the conventional water pipe connection device may come loose and be separated from the water pipe due to excessive water pressure.

SUMMARY

Therefore, an object of the disclosure is to provide a water pipe connection device that can alleviate at least one of the drawbacks of the prior art.

According to the disclosure, the water pipe connection device includes a connecting tube, a fastening member, and a fixing unit. The connecting tube includes a tube head and a tubular member. The tube head defines an installation space therein, and has a large tubular section and a small tubular section at two opposite ends thereof. A diameter of the tube head decreases in a direction from the large tubular section to the small tubular section. The large tubular section is connected to the tubular member. The small tubular section has an opening adapted for insertion of the water pipe. The fastening member is movably disposed in the installation space and is adjacent to the large tubular section. The fixing unit is movably disposed in the installation space, and includes a fixing ring and a plurality of reverse toothed structures that are disposed around the fixing ring. Each of the reverse toothed structures has a plurality of teeth portions that protrude toward a central axis of the fixing ring and that extend obliquely away from the opening. The fixing unit and the fastening member are adapted for the water pipe to extend therethrough in sequence. The water pipe is clamped and positioned by the teeth portions of the reverse toothed structures. When the water pipe connection device is in use, water flows into the installation space through a space between the tubular member and the water pipe, and the fastening member is pushed by the water to move the fixing unit towards the small tubular section, so that the fixing unit is pressed by the tube head to fix the water pipe.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
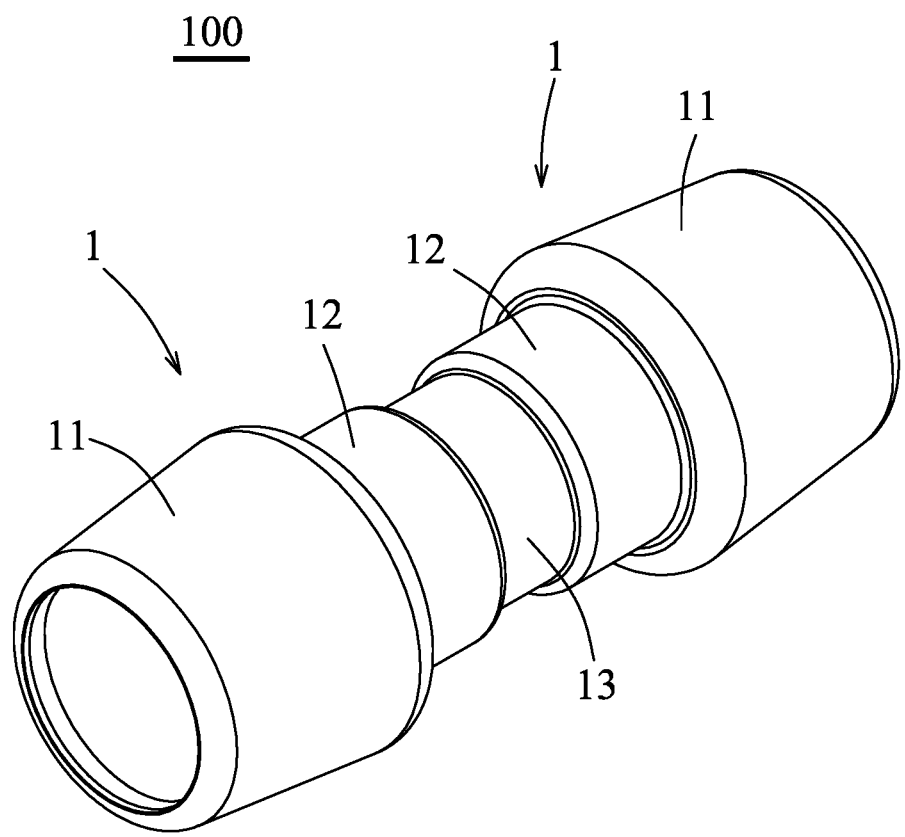
FIG. 1 is a perspective view illustrating an embodiment of a water pipe connection device according to the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
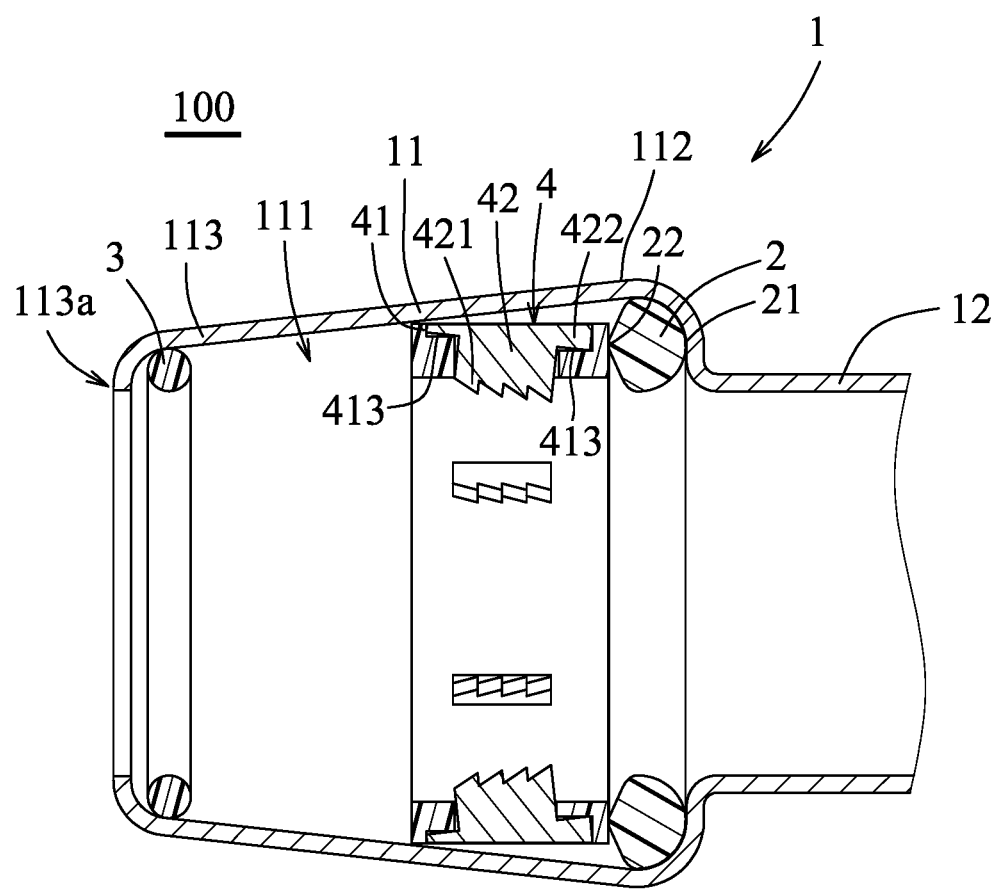
FIG. 2 is a fragmentary sectional view illustrating the embodiment.
Figure 5:
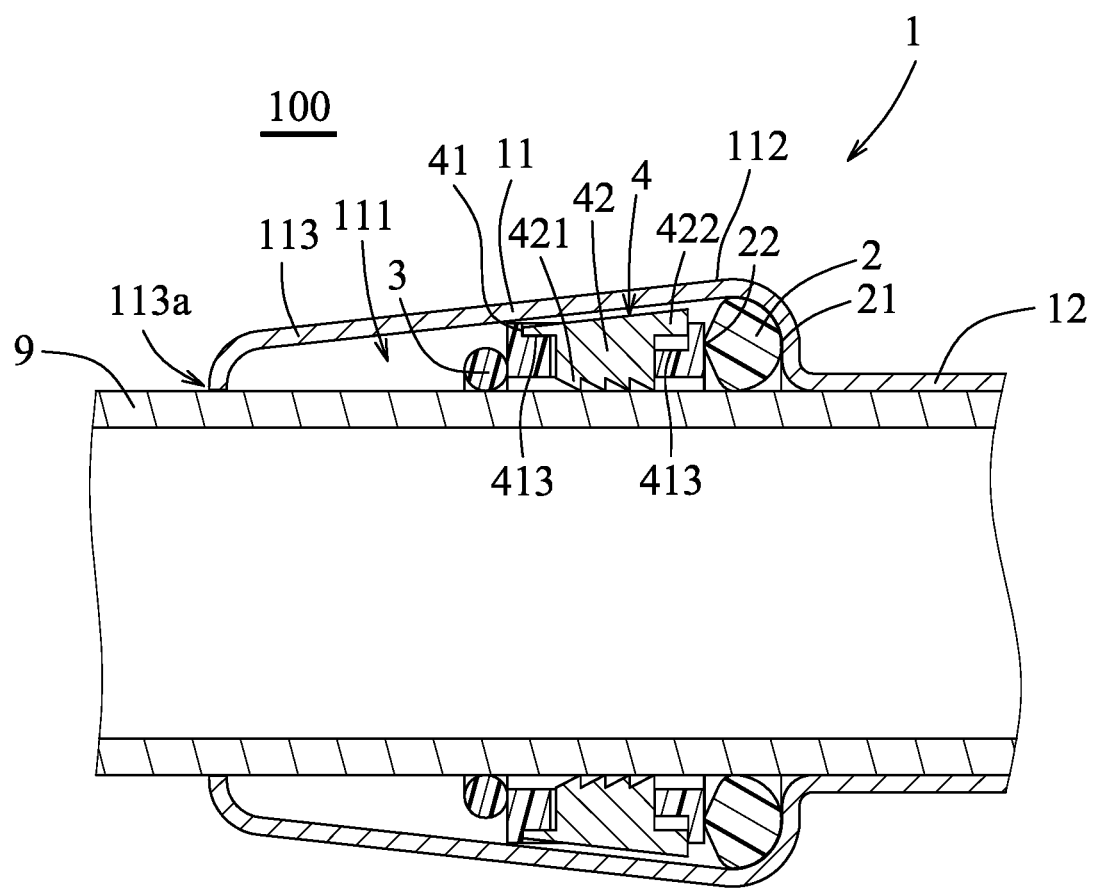
FIG. 5 is a fragmentary sectional view of the embodiment, illustrating a water pipe being inserted into a connecting tube of the embodiment.

Referring to FIGS. 1 and 2, an embodiment of a water pipe connection device 100 according to the present disclosure includes two connecting tubes 1, each of which includes a tube head 11 and a tubular member 12. The tube heads 11 of the connecting tubes 1 are respectively located at two opposite ends of the water pipe connection device 100, and the tubular members 12 are respectively connected to the tube heads 11, and are interconnected by a tubular body 13. The water pipe connection device 100 is configured for two water pipes 9 (see FIG. 5, only one water pipe 9 is shown in FIG. 5) to be respectively inserted into the tube heads 11, so that the water pipes 9 are communicated with each other through the water pipe connection device 100. However, in an alternative embodiment, the water pipe connection device 100 may include at least three connecting tubes 1, that is to say, at least one additional connecting tube 1 is connected between the tubular members 12 of the original embodiment in FIG. 1, so that the water pipe connection device 100 is able to interconnect at least three water pipes 9, thereby not limiting the number of the connecting tubes 1 of the water pipe connection device 100 to two. For example, an additional connecting tube 1 may be connected perpendicularly to the tubular member 12, so the water pipe connection device 100 forms a three-way fitting.

The water pipe connection device 100 further includes two fastening members 2 (only one is shown in FIG. 2), two sealing rings 3 (only one is shown in FIG. 2), and two fixing units 4 (only one is shown in FIG. 2). For the sake of brevity, only one of the connecting tubes 1 is described in the following paragraphs. The tube head 11 of the connecting tube 1 defines an installation space 111. The tube head 11 has a large tubular section 112 and a small tubular section 113 at two opposite ends. A tube diameter of the tube head 11 decreases in a direction from the large tubular section 112 to the small tubular section 113, so that the tube head 11 has a bell shape. The large tubular section 112 is connected to the tubular member 12. The small tubular section 113 has an opening 113a adapted for insertion of the water pipe 9 into the installation space 111.

The fastening member 2 is movably disposed in the installation space 111, and is adjacent to the large tubular section 112. In this embodiment, the fastening member 2 is an O-ring, and the fastening member 2 is made of an elastic material/a resilient material, such as rubber. The fastening member 2 has an annular rounded end portion 21 facing the tubular member 12, and an annular ridged end portion 22 facing away from the tubular member 12. An outer surrounding edge of the annular rounded end portion 21 abuts against an inner wall surface of the large tubular section 112, and an inner surrounding edge of the annular rounded end portion 21 is adapted to abut against an outer peripheral surface of the water pipe 9 to achieve a preliminary fluid-sealing effect. The annular ridged end portion 22 is used to push the fixing unit 4. Details thereof are described in later paragraphs. In an alternative embodiment, the fastening member 2 may be a spring configured to abut against the large tubular section 112 and the fixing unit 4, and is adapted to permit passage of the water pipe 9 therethrough.

The sealing ring 3 is movably disposed in the installation space 111 and is adjacent to the small tubular section 113. An outer surrounding edge of the sealing ring 3 abuts against an inner wall surface of the small tubular section 113 and is adjacent to the opening 113a, and an inner surrounding edge of the sealing ring 3 is adapted to abut against the outer peripheral surface of the water pipe 9 for further blocking water. In this embodiment, the sealing ring 3 is an O-ring, and is made of an elastic material/a resilient material, such as rubber.

Figure 3:
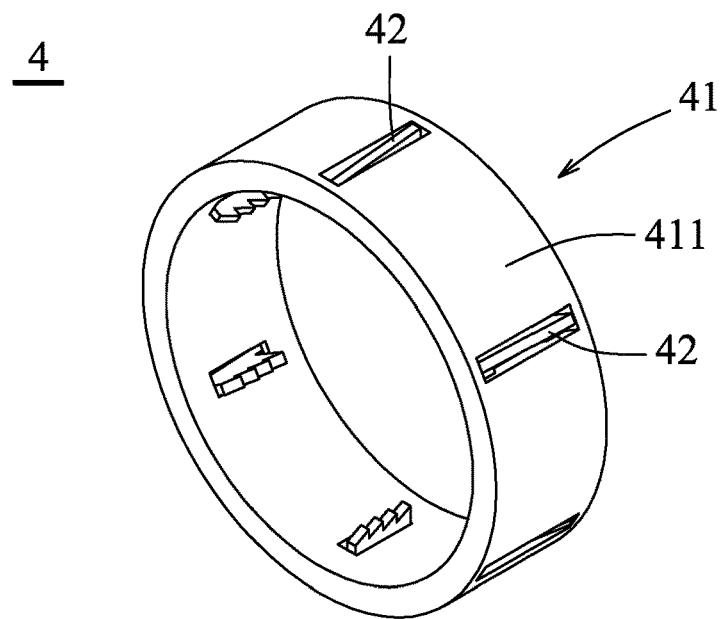
FIG. 3 is a perspective view illustrating a fixing unit of the embodiment.
Figure 4:
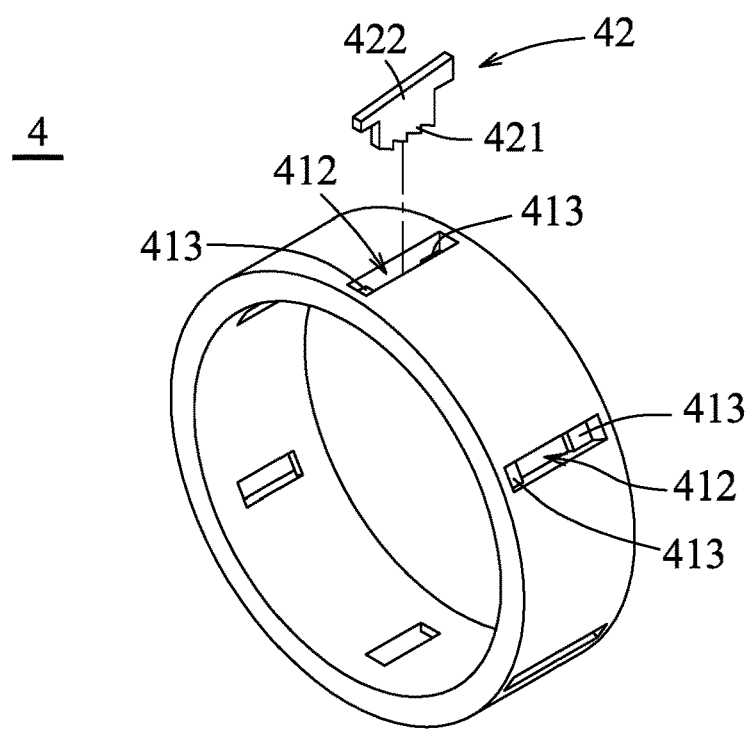
FIG. 4 is an exploded perspective view illustrating the fixing unit.

The fixing unit 4 is movably disposed in the installation space 111, and is located between the fastening member 2 and the sealing ring 3. With further reference to FIGS. 3 and 4, the fixing unit 4 includes a fixing ring 41, and a plurality of reverse toothed structures 42 disposed around the fixing ring 41. In this embodiment, the fixing ring 41 is an O-shaped ring, and is made of, for example, a plastic material. The fixing ring 41 has a ring body 411, a plurality of mounting holes 412 formed in the ring body 411, spaced apart from each other and disposed around the ring body 411, and a plurality of pairs of shoulder portions 413. Each pair of the shoulder portions 413 are formed in a respective one of the mounting holes 412 for installation of a respective one of the reverse toothed structures 42 thereon. Specifically, each of the reverse toothed structures 42 includes a plurality of teeth portions 421 protruding toward a central axis of the fixing ring 41 and extending obliquely away from the opening 113a, and an engaging portion 422 formed at radially outer ends of the teeth portions 421 and extending in an axial direction. Each of the reverse toothed structures 42 is disposed in a corresponding one of the mounting holes 412, and the engaging portion 422 of each of the reverse toothed structures 42 is removably engaged with the shoulder portions 413 in a corresponding one of the mounting holes 412.

Referring to FIGS. 1 and 5, the following paragraphs illustrate the installation process of the water pipe connection device 100 and the water pipe 9. The opening 113a of the connecting tube 1, the sealing ring 3, the fixing unit 4, the fastening member 2, and the tubular member 12 are configured to allow extension of the water pipe 9 therethrough in sequence. During assembly, the sealing ring 3 is driven by the water pipe 9 to move toward the large tubular section 112. The reverse toothed structures 42 of the fixing unit 4 are engaged to the shoulder portions 413 when the water pipe 9 is not yet being installed. After the water pipe 9 is inserted, the reverse toothed structures 42 are squeezed by the water pipe 9 to be slightly separated from the shoulder portions 413. Since the teeth portions 421 of the reverse toothed structures 42 extend obliquely in a direction away from the opening 113a, such a structure allows the water pipe 9 to pass more easily through the fixing unit 4. When the water pipe 9 is moved relative to the connecting tube 1 in a direction opposite to the insertion direction, the teeth portions 421 of the reverse toothed structures 42 clamp and limit the water pipe 9, so that the water pipe 9 is prevented from being separated from the connecting tube 1. The fastening member 2 is connected between the inner wall surface of the tube head 11 and the outer peripheral surface of the water pipe 9. Another one of the water pipes 9 may also be assembled to another one of the connecting tubes 1 in the aforesaid manner, thereby completing the assembly of the water pipes 9. By such a manner, the water pipes 9 may be prevented from being separated from the water pipe connection device 100 without an additional hot pressing step or ring. After the water pipes 9 are mounted to the water pipe connection device 100, one end of one of the water pipes 9 and one end of the another one of the water pipes 9 are simultaneously located in the tubular body 13, or respectively located in the tubular members 12 of the connecting tubes 1, such that the two adjacent ends of the water pipes 9 are located in the water pipe connection device 100, and the water pipes 9 are interconnected through the water pipe connection device 100.

Figure 6:
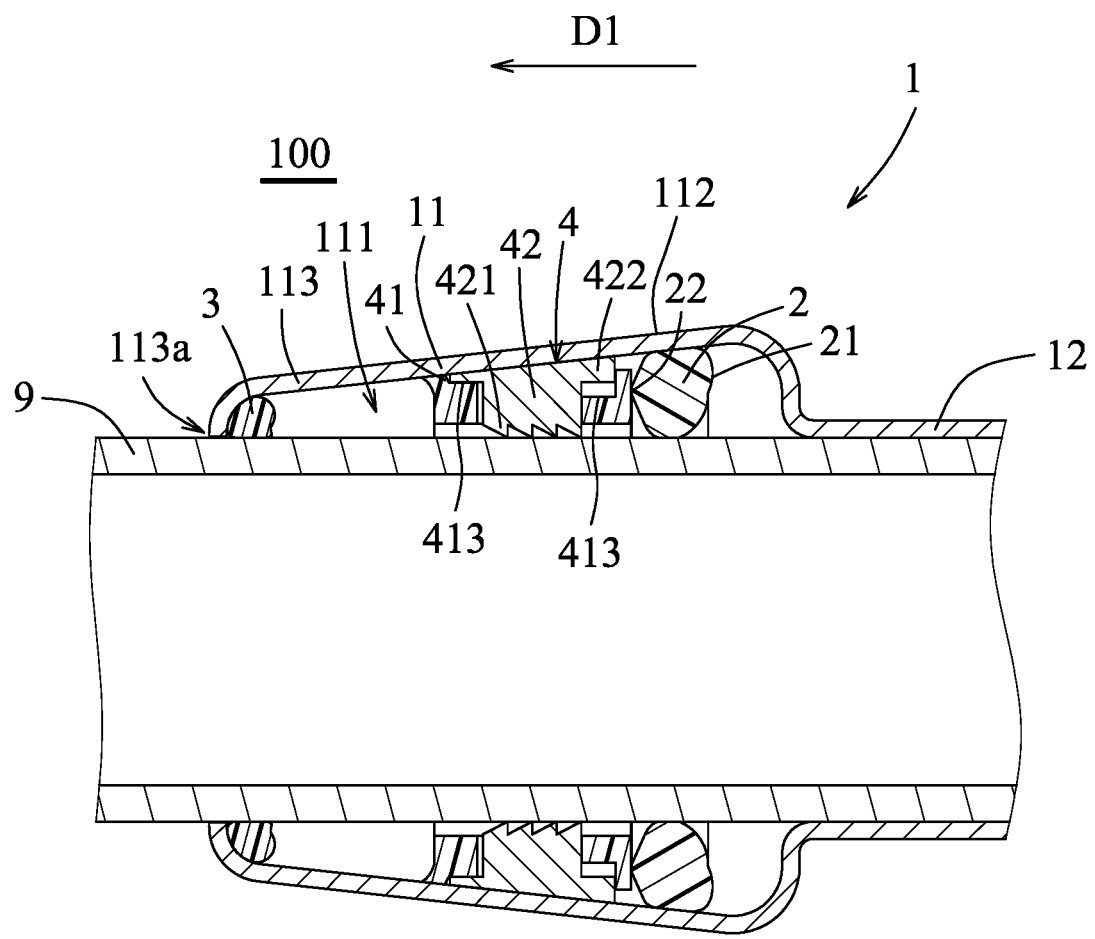
FIG. 6 is a fragmentary sectional view of the embodiment, illustrating that when water flows into an installation space of the connecting tube in a water permeation direction, the water moves a fastening member and the fixing unit.

With reference to FIG. 6, during use of the water pipe connection device 100, if water pressure of the water in one of the water pipes 9 is too great and the water flows into the tubular body 13 (see FIG. 1), the water may seep into the installation space 111 through a gap between the tubular member 12 and the another water pipe 9 in a water permeation direction (D1), and the annular rounded end portion 21 of the fastening member 2 is pushed by the water to move toward the small tubular section 113. During the above-mentioned movement of the fastening member 2, the annular ridged end portion 22 of the fastening member 2 pushes the fixing ring 41 of the fixing unit 4 such that the fastening member 2 drives the fixing ring 41 to move toward the small tubular section 113. The fastening member 2 is compressed by the water and the fixing ring 41 to deform. A tip end of the annular ridged end portion 22 of the fastening member 2 may extend into a gap between the fixing ring 41 and the tube head 11 such that the fastening member 2 presses against the fixing ring 41 through an inclined surface of the annular ridged end portion 22 and drives the fixing ring 41 to move toward the small tubular section 113. The closer the fixing ring 41 is to the small tubular section 113, the more the fixing ring 41 and the reverse toothed structures 42 are deformed by the tube head 11 to slightly move toward the water pipe 9, so that the reverse toothed structures 42 are pressed against the water pipe 9 to prevent separation of the water pipe 9 from the tube head 11. When the water flows through a space between the fastening member 2 and the water pipe 9 in the water permeation direction (D1) or through a space between the fastening member 2 and the tube head 11, the water may flow through the fixing ring 41 and towards the sealing ring 3. The sealing ring 3 is pushed by the water to move toward a bent portion of the small tubular section 113, so that the sealing ring 3 is tightly sealed between a space between the water pipe 9 and the opening 113a to achieve the effect of fluid-sealing and preventing the water from escaping via the opening 113a. Moreover, when the fastening member 2 is configured as a spring, the spring is compressed by the water flow to generate an elastic force to press against the fixing unit 4, so that the fixing unit 4 is able to move toward the small tubular section 113 to further press the reverse toothed structures 42 against the water pipe 9.

It should be noted that, in a modification of this embodiment, the number of the connecting tubes 1, the number of the fastening members 2, the number of the sealing rings 3, and the number of the fixing unit 4 of the water pipe connection device 100 may each be one. In the installation process of this modification, one of the water pipes 9 extends into the connecting tube 1 via the opening 113a, and another one of the water pipes 9 extends into the tubular member 12 via an opening (not shown) of the tubular member 12 distal from the tube head 11 and is secured in the tubular member 12 via some fixing means, such that two adjacent ends of the water pipes 9 are located simultaneously in the tubular member 12.

In summary, through the structural feature of the reverse toothed structures 42 of the fixing unit 4, the water pipe 9 of the water pipe connection device 100 is able to extend through the water pipe connection device 100 in one direction, and may be prevented from being separated from the water pipe connection device 100 in an opposite direction without the additional hot pressing step or the ring. Because the fastening member 2 is pushed by the water flow to move the fixing ring 41 toward the small tubular section 113, the fixing ring 41 and the reverse toothed structures 42 are pressed by the tube head 11 to drive the reverse toothed structures 42 to press against and fix the water pipe 9, so that as the water pressure increases, the water pipe 9 is increasingly secured, thereby achieving the purpose of this disclosure.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A water pipe connection device adapted for insertion of a water pipe therein, said water pipe connection device comprising:
a connecting tube including a tube head and a tubular member, said tube head defining an installation space therein, and having a large tubular section and a small tubular section at two opposite ends thereof, a diameter of said tube head decreasing in a direction from said large tubular section to said small tubular section, said large tubular section being connected to said tubular member, said small tubular section having an opening adapted for insertion of the water pipe;
a fastening member movably disposed in said installation space and adjacent to said large tubular section; and
a fixing unit movably disposed in said installation space, and including a fixing ring, and a plurality of reverse toothed structures that are disposed around said fixing ring, each of said reverse toothed structures having a plurality of teeth portions that protrude toward a central axis of said fixing ring and that extend obliquely away from said opening;
wherein said fixing unit and said fastening member are adapted for the water pipe to extend therethrough in sequence, said water pipe being clamped and positioned by said teeth portions of said reverse toothed structures, when said water pipe connection device is in use, water flowing into said installation space through a space between said tubular member and said water pipe, and said fastening member being pushed by the water to move said fixing unit towards said small tubular section, so that said fixing unit is pressed by said tube head to fix said water pipe; and
wherein said water pipe connection device further comprises a sealing ring that is disposed in said installation space and that is adjacent to said small tubular section.

2. The water pipe connection device as claimed in claim 1, wherein said fastening member is an O-ring made of an elastic material.

3. The water pipe connection device as claimed in claim 2, wherein said fastening member includes an annular ridged end portion facing away from said tubular member and abutting against said fixing unit.

4. The water pipe connection device as claimed in claim 1, wherein said sealing ring is made of an elastic material and permits the water pipe to extend therethrough.

5. The water pipe connection device as claimed in claim 1, wherein said fixing ring includes a ring body, a plurality of mounting holes formed in said ring body, spaced apart from each other and disposed around said ring body, and a plurality of pairs of shoulder portions, each pair of said shoulder portions being disposed in a respective one of said mounting holes, each of said reverse toothed structures further having an engaging portion formed at radially outer ends of said teeth portions and extending in an axial direction, said reverse toothed structures being respectively disposed in said mounting holes, said engaging portion of each of said reverse toothed structures being removably engaged with a corresponding pair of said shoulder portions in a corresponding one of said mounting holes.

6. A water pipe connection device adapted for insertion of a water pipe therein, said water pipe connection device comprising:
a connecting tube including a tube head and a tubular member, said tube head defining an installation space therein, and having a large tubular section and a small tubular section at two opposite ends thereof, a diameter of said tube head decreasing in a direction from said large tubular section to said small tubular section, said large tubular section being connected to said tubular member, said small tubular section having an opening adapted for insertion of the water pipe;

a fastening member movably disposed in said installation space and adjacent to said large tubular section; and a fixing unit movably disposed in said installation space, and including a fixing ring, and a plurality of reverse toothed structures that are disposed around said fixing ring, each of said reverse toothed structures having a plurality of teeth portions that protrude toward a central axis of said fixing ring and that extend obliquely away from said opening;

wherein said fixing unit and said fastening member are adapted for the water pipe to extend therethrough in sequence, said water pipe being clamped and positioned by said teeth portions of said reverse toothed structures, when said water pipe connection device is in use, water flowing into said installation space through a space between said tubular member and said water pipe, and said fastening member being pushed by the water to move said fixing unit towards said small tubular section, so that said fixing unit is pressed by said tube head to fix said water pipe;

wherein said fastening member is an O-ring made of an elastic material; and wherein said fastening member includes an annular ridged end portion facing away from said tubular member and abutting against said fixing unit.

\* \* \* \* \*